United States Patent Office 3,546,340
Patented Dec. 8, 1970

---

3,546,340
OXYGEN-TREATED N-SUBSTITUTED PIPER-
AZINES AS BIRD REPELLENTS
Lyle D. Goodhue, Bartlesville, Kenneth E. Cantrel, Dewey, and Andrew J. Reinert, Bartlesville, Okla., assignors to Phillips Petroleum Company, a corporation of Delaware
No Drawing. Filed July 21, 1966, Ser. No. 566,770
Int. Cl. A01n 9/22
U.S. Cl. 424—250                              7 Claims

---

ABSTRACT OF THE DISCLOSURE

The bird repellent properties of selected nitrogen-substituted piperazines and morpholines are improved by treating or contacting these compounds with oxygen or an oxygen-containing gas, such as air, prior to applying the compound to a surface from which birds are to be repelled.

---

This invention relates to bird repellents. In one aspect, this invention relates to methods of rendering a surface repellent to birds. In another aspect, this invention relates to novel bird repellent compositions.

The task of deterring birds from resting on exposed surfaces such as window sills, roofs, and ledges of buildings has become a problem of major concern. Thousands of dollars are spent annually by property owners, especially in large metropolitan areas, to clean buildings which have been used as resting places for such birdss as starlings, pigeons, sparrows, and the like. Although devices such as scarecrows, noisemakers, etc., have been used with moderate success for discouraging birds from resting in open fields and the like, these devices are not suitable for use on or near large buildings which afford a variety of different resting places for birds. While the bird repellent compositions of this invention are not restricted for use on or near large buildings, they are particularly suited for use in this type situation.

Applicants' copending, commonly assigned U.S. patent application Ser. No. 417,494, filed Dec. 10, 1964, now abandoned, discloses and claims nitrogen-substituted piperazines and nitrogen-substituted morpholines as bird repellents. While these compounds are very effective for repelling birds from a surface to which they have been applied, continued research has resulted in the discovery of a technique for treating the selected nitrogen-substituted compounds of applicants' copending application to improve their bird repellent properties.

According to this invention, the bird repellent properties of selected N-substituted piperazines and morpholines are improved by treating or contacting the same with oxygen or an oxygen-containing gas such as air prior to applying the compound to the surface from which birds are to be repelled.

Accordingly, it is an object of this invention to prevent birds from resting on a particular surface. Another object of this invention is to provide a method of rendering a surface repellent to birds. These and other objects of the invention will become apparent to one skilled in the art after studying the following detailed description and the appended claims.

According to this invention, the nitrogen-substituted piperazines and morpholines which can be contacted with oxygen for the purpose of improving their bird repellent properties are represented by the formula

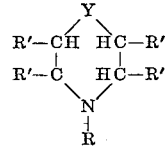

wherein (a) R is selected from the group consisting of

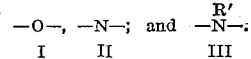

(b) R' is selected from the group consisting of hydrogen and methyl;
and (c) Y is selected from the group consisting of $$-O-, \quad -N-; \quad \text{and} \quad -N-;$$
$$\quad\quad\quad\quad\quad\quad\quad\quad\quad\quad\quad\;\; R'$$
$$\text{I} \quad\quad\;\; \text{II} \quad\quad\quad\quad \text{III}$$

and when Y is —O—, R is selected from the group consisting of

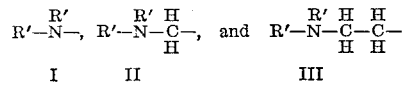

Exemplary compounds which are within the scope of the above formula and which can be employed in the practice of the method of this invention include 1-aminopiperazine
1-(aminomethyl)piperazine
1-(2-aminoethyl)piperazine
1-(3-aminopropyl)piperazine
1-amino-4-methylpiperazine
1-(aminomethyl)-4-methylpiperazine
1-(2-aminoethyl)-2-methylpiperazine
1-(3-aminopropyl)-4-methylpiperazine
1-(3-aminopropyl)-2,3,5,6-tetramethylpiperazine
1,4-diaminopiperazine
1,4-bis(dimethylamino)piperazine
1-(methylaminomethyl)-4-(2-methylaminoethyl) piperazine
1,4-bis(3-aminopropyl)piperazine
1-(dimethylamino)piperazine
1,4-bis(3-dimethylaminopropyl)-2,3,5,6-tetramethyl-piperazine
4-aminomorpholine
4-(aminomethyl)morpholine
4-(2-aminoethyl)morpholine
2-methyl-4-(methylamino)morpholine
2,5-dimethyl-4-(dimethylamino)morpholine
2,3,5-trimethyl-4-(methylaminomethyl)morpholine
2,3,5,6-tetramethyl-4-(2-dimethylaminoethyl)morpholine
and the like.

The nitrogen-substituted piperazines and morpholines which are used in the practice of this invention can be prepared in accordance with suitable processes well known in the art. For example, 1-(2-aminoethyl)piperazine can be obtained by contacting tris(2-chloroethyl)amine with ammonium hydroxide under conditions which will promote formation of a substituted piperazine. 4-(2-Aminoethyl)morpholine can be obtained by hydrogenating 4-

(cyanomethyl)morpholine under suitable conditions of temperature and pressure.

The N-substituted piperazines and morpholines can be contacted with oxygen prior to being applied to the surface from which birds are to be repelled by any suitable technique for a period of time sufficient to improve the bird repellent properties of the compound. For example, the compound can be contacted with an oxygen-containing gas by bubbling the gas through a vessel containing the compound, by spraying the compound through a chamber containing the gas, or by trickling the compound in the form of droplets through the gas. Although any oxygen-containing gas can be used to treat the compounds in accordance with this invention, air is preferred because of its low cost and because it is readily available.

The temperature at which the treatment is conducted can vary over a wide range but will generally be in the range of about 0 to 100° C. and is usually conducted within the range of about 20 to about 60° C. The length of the treatment can vary over a broad range which will depend at least in part on the temperature employed. Generally, the compound will be contacted for a period within the range of about 10 minutes to about 30 days or more and preferably within the range of about 6 hours to about 15 days. The rate of flow of the oxygen-containing gas through the compound is most conveniently maintained within the range of about 50 to about 10,000 milliliters per minute per kilogram of compound and preferably within the range of about 200 to about 3000 milliliters per minute per kilogram of compound. While the treatment can be effected at superatmospheric pressures or subatmospheric pressures, it is generally preferred for convenience to conduct the treatment at substantially atmospheric pressure.

The treated bird repellent compounds of this invention can be applied to a surface for their intended purpose as the pure compound or in solution in an inert solvent. Suitable inert solvents which can be used in the practice of this invention include acetone, naphthas, and isoparaffinic hydrocarbons which boil in the range of about 260° to about 800° C. The bird repellent compounds can also be applied to a surface in admixture with water in the form of an aqueous emulsion in which a suitable emulsifying or wetting agent is employed. In certain instances, it may be desirable to apply the compounds as a dust or a powder. The compounds can be dispersed in a solid carrier such as kieselguhr and the like when applied in this manner. A suitable adhesive can be admixed with the liquid or solid carrier such that the bird repellent composition will remain on the surface to which it is applied for extended periods of time. The use of an adhesive is also effective when the composition is applied in its pure form. The use of an adhesive is generally preferred when the composition is applied to exposed ledges and window sills of buildings because it will be less affected by the action of rain and wind. Exemplary materials which can be used as carriers and which also function as an adhesive are rubber latices includes both the natural and synthetic types. Polymers of butadiene and isoprene and copolymers of butadiene or isoprene with a vinyl compound such as styrene, a gelatin or a substituted cellulose such as methylcellulose, can be used as carrier and adhesive for the compounds of the invention. Latex has also been found to be particularly suitable as a carrier and adhesive when used in the practice of this invention.

Any suitable technique such as spraying, brushing, dusting, etc, can be used for applying the composition in any one of the previously described forms. In order to obtain a uniform coating, it is generally preferred to apply the compounds by spraying them. When the repellent composition is dissolved in one of the solvents described above, the mixture will contain about 0.1 to about 60 or more weight percent of the composition. When the composition is dispersed in a solid carrier, it is present in an amount within the range of about 1 to about 60 weight percent based upon the total weight of the mixture. These ranges are exemplary only since it is understood that concentrations above and below these ranges can be used if desired.

The compounds of this invention are applied to a surface in an amount which is sufficient to render the surface repellent to birds. It is generally preferred to apply the composition in an amount which will provide a concentration of about 0.01 to about 25 grams per square foot of surface area. Although larger amounts of the composition can be used without departing from the spirit and scope of the invention, for economic reasons it is generally preferred not to exceed about 25 grams per square foot of surface area.

A series of runs was made to illustrate the effectiveness of the compounds treated with an oxygen-containing gas in accordance with the invention. The results of these runs are outlined in the following example. This example is for the purpose of illustration only and must not be considered limiting of the invention.

EXAMPLE

A bird repellent composition of this invention was obtained by contacting 1-(2-aminoethyl)piperazine with air by bubbling the air through 400 grams of the substituted piperazine compound at a rate of about 720 milliliters per minute at room temperature for 15 days. A cage in the form of a wire-enclosed pen 54 feet long and 18 feet wide was used to test and compare the effectiveness of the air-treated 1-(2-aminoethyl)piperazine with 1-(2-aminoethyl)piperazine which had not been contacted with air. The cage contained between about 30 and about 60 starlings during the runs. These starlings had been trapped locally and were confined in the cage for a period of between several months to over a year in order for them to become accustomed to their surroundings. A roosting bar which would accommodate four starlings comfortably was situated in a sheltered area at one end of the cage. Aside from the wire sides and the bottom of the cage, the roosting bar was the only roosting surface in the cage. An electrical recorder connected to the roosting bar transmitted a signal representative of the weight of a bird or birds on the roosting bar during a run. The number of starlings actually resting on the roosting bar was determined from these data. In a given run, the air-treated 1-(2-aminoethyl)piperazine was placed on the surface of the roosting bar in an amount sufficient to provide a concentration of about 15 grams per square foot. The recorder was then placed in operation and the duration of the time at which none or one or more of the starlings occupied the roost was recorded. Table I below represents the results which were obtained.

TABLE I

| Run No. | Compound | Duration of run, minutes | Number of starlings (from none through four) on the roosting bar and time which this number of starlings spent on the roosting bar (minutes) | | | | |
|---|---|---|---|---|---|---|---|
| | | | 0 | 1 | 2 | 3 | 4 |
| 1 | Air-treated 1-(2-aminoethyl)piperazine. | 780 | 780 | 0 | 0 | 0 | 0 |
| 2 | do | 765 | 765 | 0 | 0 | 0 | 0 |
| 3 | do | 780 | 780 | 0 | 0 | 0 | 0 |

In order to illustrate the improved results obtained by treating the selected N-substituted piperazines and morpholines with an oxygen-containing gas prior to applying them to a surface to repel birds, several runs were made with the same piperazine compound without the air treatment. These runs were conducted under conditions substantially identical to the conditions which existed during the runs with the air-treated piperazine compound. The results are reported in Table II below.

TABLE II

| Run No. | Compound | Duration of run, minutes | Number of starlings (from none through four) on the roosting bar and time which this number of starlings spent on the roosting bar (minutes) | | | | |
|---|---|---|---|---|---|---|---|
| | | | 0 | 1 | 2 | 3 | 4 |
| 4 | 1-(2-aminoethyl)piperazine | 676 | 100 | 151 | 425 | 0 | 0 |
| 5 | do | 545 | 0 | 18 | 527 | 0 | 0 |
| 6 | do | 750 | 24 | 10 | 60 | 633 | 13 |
| 7 | do | 680 | 35 | 25 | 620 | 0 | 0 |
| 8 | do | 670 | 70 | 7 | 593 | 0 | 0 |

It can be seen from the data obtained in Runs 1, 2 and 3 that the starlings completely avoided the roosting bar. It can also be seen that the air treatment of the compound before application to a surface improves its bird repellent properties.

Although the invention has been described in considerable detail, it must be understood that such detail is not intended to be limiting of the invention.

We claim:

1. A method of rendering a surface repellent to birds comprising the step of applying to said surface the composition resulting from oxygen treatment of a compound of the formula 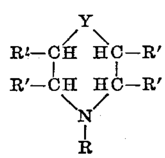 wherein (a) R is 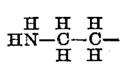 (b) R' is selected from the group consisting of hydrogen and methyl; and (c) Y is wherein said oxygen treatment comprises treating with air while maintaining said compound at a temperature within the range of about 0 to about 100° C. for a period of time within the range of about 10 minutes to about 30 days.

2. A method according to claim 1 wherein said compound is treated with air as an oxygen-containing gas, and wherein the treatment is effected by spraying said compound through a chamber containing the air prior to applying said compound to said surface.

3. A method according to claim 1 wherein said compound is treated with air as an oxygen-containing gas, and wherein the treatment is effected by trickling said compound in the form of droplets through the air prior to applying said compound to said surface.

4. A method according to claim 1 wherein said compound is 1-(2-aminoethyl)piperazine.

5. A method according to claim 1 wherein said compound is applied to said locus by means of a liquid carrier selected from the group consisting of water, acetone, kerosene, naphthas, and isoparaffinic hydrocarbons which boil in the range of between about 260° to about 800° F.

6. A method according to claim 1 wherein said compound is applied in admixture with an adhesive selected from the group consisting of latex, gelatin, methylcellulose, polyisobutylene, and petrolatum.

7. A method according to claim 1 wherein said compound is dispersed in kieselguhr and applied to said surface.

References Cited

UNITED STATES PATENTS 3,335,051 8/1967 Reinert et al. ........ 424—250

STANLEY J. FRIEDMAN, Primary Examiner

U.S. Cl. X.R.

424—248